(12) United States Patent
Gralenski

(10) Patent No.: US 7,059,580 B1
(45) Date of Patent: Jun. 13, 2006

(54) PINCH VALVE SUITED FOR METALS AND OTHER RIGID MATERIALS

(76) Inventor: Nicholas Gralenski, 1797 Cheryl Way, Aptos, CA (US) 95003

( * ) Notice: Subject to any disclaimer, the term of this patent is extended or adjusted under 35 U.S.C. 154(b) by 0 days.

(21) Appl. No.: 10/926,540

(22) Filed: Aug. 25, 2004

(51) Int. Cl.
*F16K 31/02* (2006.01)

(52) U.S. Cl. .......................... 251/129.06; 251/4; 251/7; 138/119

(58) Field of Classification Search .................. 251/4, 251/7, 11; 138/118, 119
See application file for complete search history.

(56) References Cited

U.S. PATENT DOCUMENTS 4,515,536 A * 5/1985 van Os ........................ 417/394
5,088,522 A * 2/1992 Rath et al. .................. 138/119
5,351,932 A * 10/1994 von Herrmann ............... 251/4

* cited by examiner

Primary Examiner—Edward K. Look
Assistant Examiner—John K. Fristoe, Jr.
(74) Attorney, Agent, or Firm—Michael Hetherington; Woodside IP Group; Morrison Ulman

(57) ABSTRACT

A pinch valve is described wherein the critical flow path is modified to form a space between two opposing metal disks that transition between an open and a closed state. The disks are characterized by a spring constant and act like a diaphragm. A closure force is applied externally to completely close the disks and truncate flow, while providing a substantially perfect seal. Removal of the external force enables the disks to spring open and initiate flow. The pinch valve advantageously eliminates valve bodies, dead space, moving parts and seals, such as elastomers, that are subject to wear and corrosion.

1 Claim, 5 Drawing Sheets

(Top View Figure 4)

(Section A-A Figure 5)

PINCH VALVE SUITED FOR METALS AND OTHER RIGID MATERIALS

FIELD OF THE INVENTION

The field of the invention relates generally to flow control valves. In particular, the field of the invention relates to a pinch valve wherein the critical flow path is modified to form a transition between opposing metal disks acting like a spring activated diaphragm. The closing force is provided externally to the disks to truncate flow. Thus, particle build-up is completely eliminated within the valve. Also, since the valve mechanism is completely external to the flow passage, degradable components such as moving parts, seals, elastomers, dead space, and valve bodies are advantageously eliminated.

BACKGROUND OF RELATED ART

Regulating valves have many applications in industry. A wide variety of valves have been developed to serve many different industrial requirements. For some demanding applications requiring high flow rates, high temperatures, corrosive materials or precision cut-off, such as semi-conductor processing, precision instruments, medical, pharmaceuticals, chemical, food processing or the like, existing valve designs are not fully satisfactory.

The limitations of existing valve designs can be subtle but vitally important. These limitations include factors such as: materials required (for the valve construction) such as plastics, elastomers, metals etc. which lead to contamination, corrosion, reliability, particles maintenance and cost issues; sliding surfaces which lead to wear particles, contaminating lubricants, cleaning and sanitation difficulties; complex geometry with accompanying purge and cleaning difficulties. Also large size, temperature limitations and high cost are other complicating factors that limit conventional pinch valve design.

However, even when cost is no object, it still often can be difficult to provide a pinch valve design that would satisfy all the requirements of industry. Therefore, what is needed is a valve with improved features for demanding applications. For example, it would be desirable for such a value to provide improved throttling and sealing characteristics, low friction losses, high flow rates, and resistance to corrosive materials and high temperature.

SUMMARY

An aspect of the invention provides a valve wherein the critical flow path is modified to form a space between two opposing metal disks that transition between an open and a closed state. The disks are characterized by a spring constant and act like a diaphragm. A closure force is applied externally to completely close the disks and truncate flow, while providing a substantially perfect seal. Removal of the external force enables the disks to spring open and initiate flow. An aspect of the invention advantageously eliminates valve bodies, dead space, moving parts and seals, such as elastomers that are subject to wear and corrosion.

BRIEF DESCRIPTION OF THE DRAWINGS

The foregoing and other features, aspects and advantages of the invention will become better understood with regard to the following descriptions, appended claims and accompanying drawings in which:

DETAILED DESCRIPTION

Figure 1:
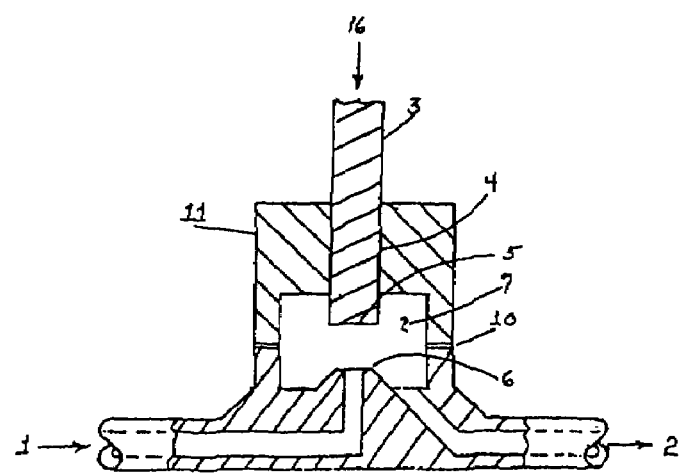
FIG. 1 is a simplified cross-sectional diagram of a conventional globe valve.

FIG. 1 is a simplified diagram of a conventional design called a "globe" valve. A pressurized inlet for a flow path is usually applied at 1 so that when shaft 3 is applied to seat 6 (in closed position), seal area 4 is not subjected to constant pressure or persistent leakage if seal 4 fails. Flow proceeds to outlet 2 in normal operation. For a vacuum application, ports 1 and 2 are commonly reversed. A vacuum at 1 is protected against risk of leakage at 4. A variety of threaded connections are commonly used at ports 1 and 2. A variety of thread structures are commonly present to facilitate motion and sealing of shaft 3. This motion risks leakage, may require contaminating lubrication, produces wear particles, and is associated with a circumferential cavity or annulus 7 that can collect debris and is difficult to clean. The valve, except for seals, is commonly metal. The shaft tip 5 commonly incorporates an elastomer to improve sealing at seat 6. The sliding seals, the seal materials themselves and the dead space 7 all tend to be objectionable for demanding applications. Other common valves such as gate, ball, butterfly and petcocks or stopcocks share the same kinds of problems.

Figure 2:
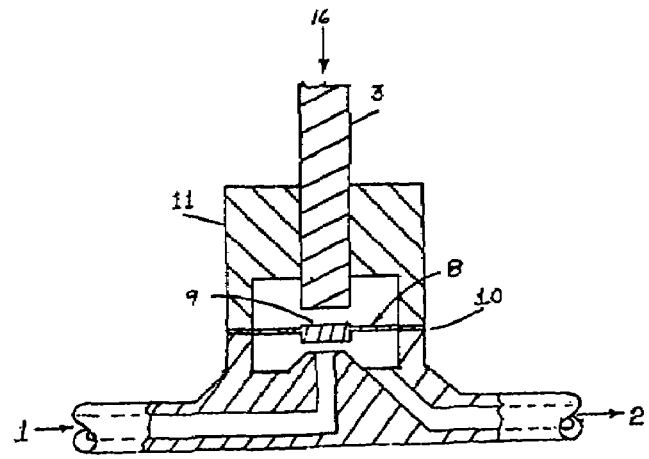
FIG. 2 is a variation of a conventional globe valve of FIG. 1 wherein a diaphragm is inserted between the seat and shaft tip.

FIG. 2 shows a variation on FIG. 1 wherein a diaphragm 8 is inserted between seat 6 and shaft tip 5. This is the principle of a diaphragm valve. A threaded compression seal or weld seal at 10 completes the diaphragm installation. This means that particles, contamination or leak risk associated with shaft 3 are eliminated from the fluid flow path from 1 to 2.

However, the annulus 7 still remains. Also, the sealing portion 9 of the diaphragm may still require an elastomeric surface against seat 6 as well as the twisting force of 3 against sealing portion 9 in the valve closing process.

The body 11 of either valve may be undesirably large as well as expensive for replacement, particularly if high-grade design, construction and materials are involved.

Figure 3:
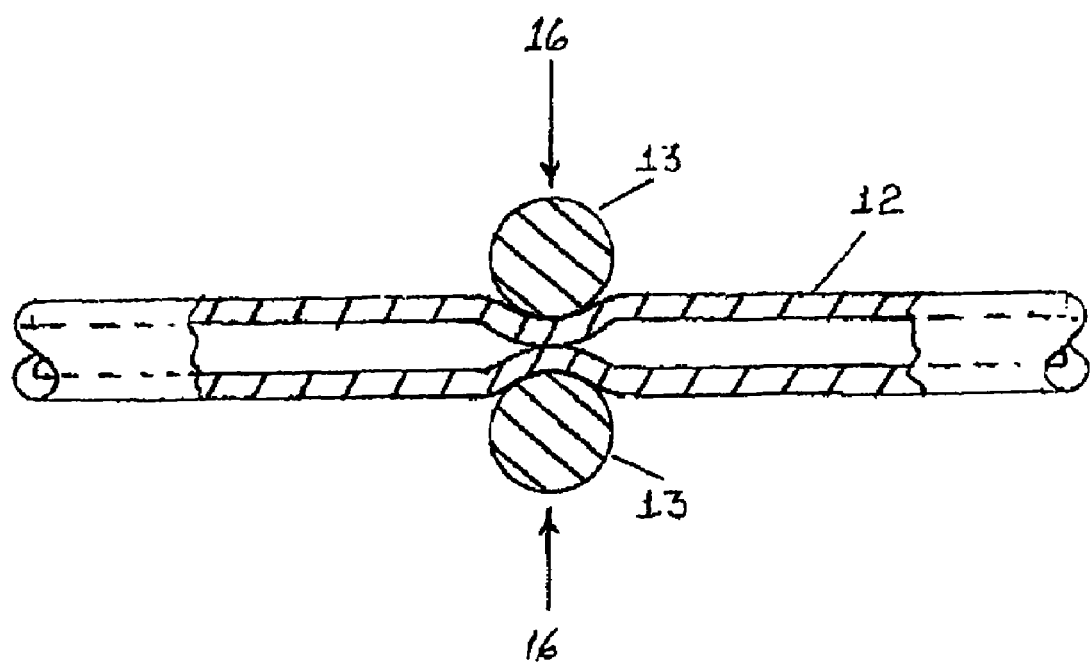
FIG. 3 shows a cross-sectional view of a conventional pinch value comprising soft plastic or rubber tubing.

If the plumbing material is soft plastic or rubber, as tubing 12 in FIG. 3, a very simple pinch valve can be utilized as shown. Clamps 13 pinch the tubing 12 to restrict or completely stop fluid flow.

This pinch valve is very commonly used in hospitals for intravenous food or medication flow control. The design of such a conventional pinch valve is simple, effective and inexpensive, requiring no seals or sliding parts, no lubrication, no dead spaces (such as annulus 7) and the valve mechanism is totally external to the flow passage (no counter part to body 11).

For some medical applications, the conventional pinch valve of FIG. 3 may be entirely compatible. For many other industrial applications, however, rubber or plastic, 12, would be entirely unacceptable and must be replaced by carefully chosen, fabricated and cleaned tubing such as stainless steel. But since stainless steel is so rigid and inflexible, a conventional pinch valve such as in FIG. 3 would be impracticable if not impossible to implement.

Figure 4:
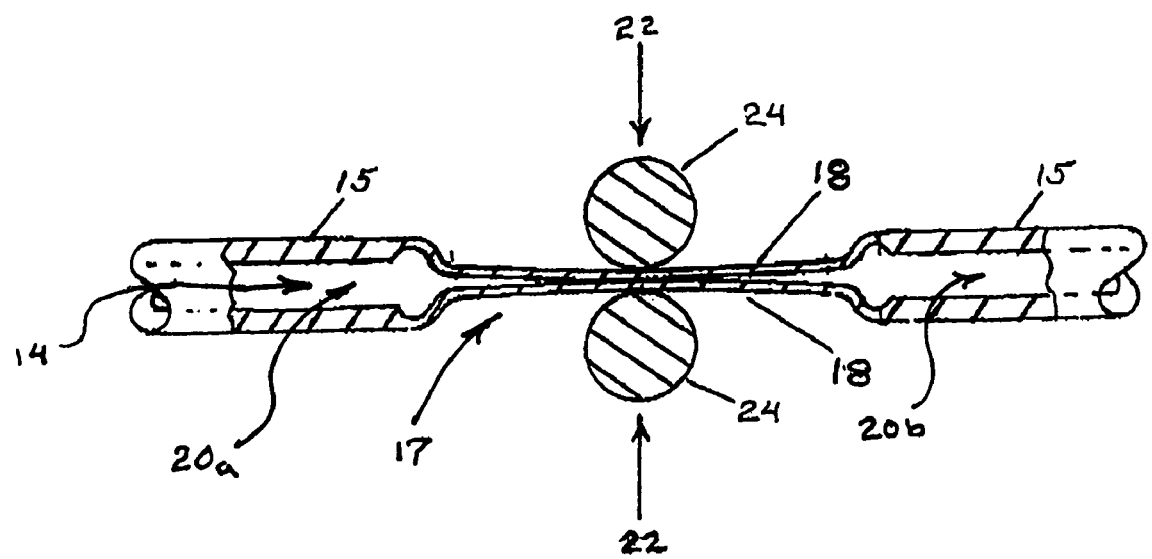
FIG. 4 is a cross-sectional view of a pinch value wherein a flow path is modified to transition into an annular space between opposing metal disks in accordance with an aspect of the invention.
Figure 5:
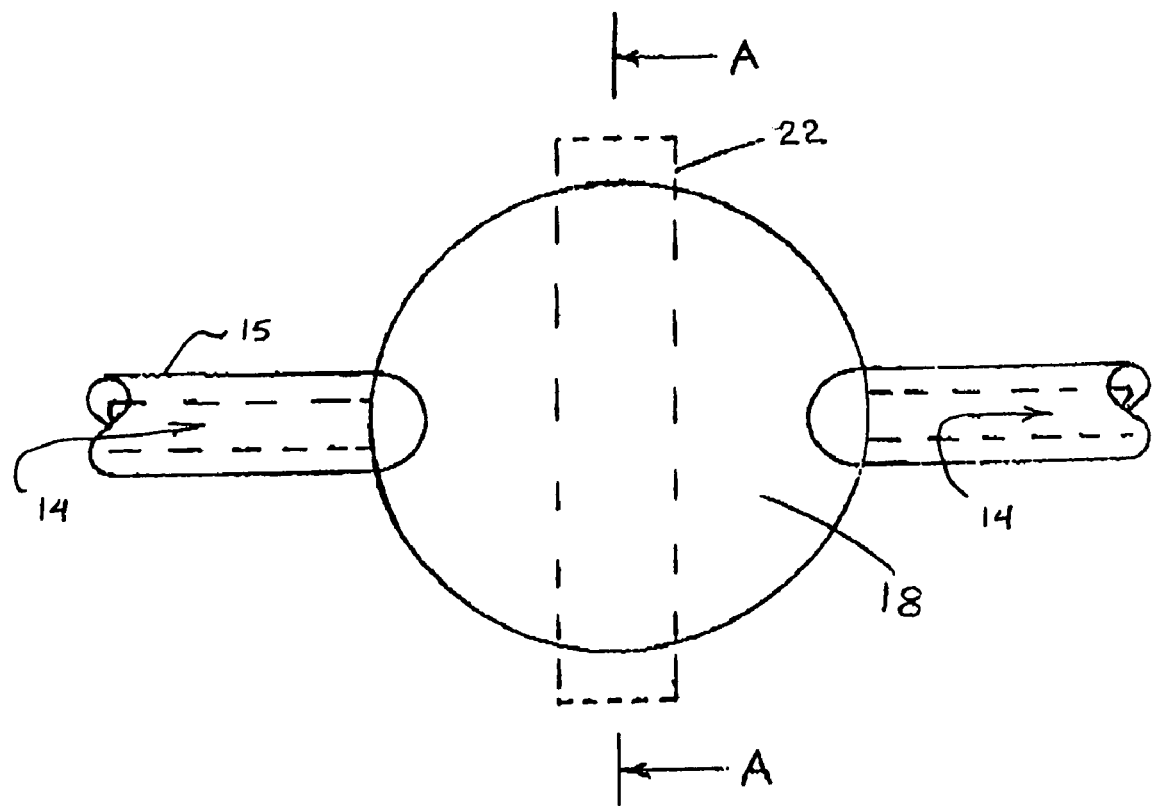
FIG. 5 is a top view of the valve of FIG. 4 in accordance with an aspect of the invention.

Referring FIGS. 4 and 5, in accordance with an aspect of the invention, a flow path 14 defined by metallic tubing 15 is modified to transition into an annular space 16. Viewed from above, as shown in FIG. 5, annular space 16 forms annular mating surfaces or opposing disks 18 characterized by a spring action. Such spring action in opposing disks 18 provide improved throttling characteristics of fluid in flow path 14, and sealing of the flow path 14 can be obtained without introducing complex or contaminating control surfaces. Referring to FIG. 4, metallic tubing 15 forms a flow path 14 for a flowable material. A first tubular channel 20a or portion of tubing 15 defines an entry flow path. A second tubular channel 20b or portion of tubing 15 forms an exit flow path. The entrance and exit flow paths of tubing 15 are modified to transition in a taper into annular space 16 that acts as a closure region defined by the two opposing annular mating surfaces or disks 18, characterized by a spring action. It is important to transition the flow paths 20a, 20b gradually into and out of the closure region, respectively, to maintain laminar flow as much as possible and to prevent formation of turbulent flow. The interior, fluid contacting surface of disks 18 comprise mating sealing surfaces that form the closure region and completely truncate flow through annular space 16, when the sealing surfaces of opposing disks 18 are seated against each other.

Disks 18 transition between a closed and open state depending on the application of an external force 22 by clamps 24, or an internal force applied by a positive pressure of the material flowing through the flow path defined by tubing 15. In assembly, disks 18 are sealed or welded at their edges to the tubing 15, at the point where the tubing transitions into the annular space formed by the disks 18. The disks 18 interoperate to act like a spring activated diaphragm.

It is important that the interior mating surfaces of disks 18 that define the control surface for closure of the flow path are characterized by extreme surface smoothness without any asperities. This enables complete truncation of flow without any leaks when the disks 18 are seated against each other in the closed state. Clamps 24 and force 22 are applied to the metallic disks 18 of FIGS. 4 and 5 to create a control surface that completely truncates the flow path. Because of the flexibility provided by disks 18, there are no particles, moving parts, seals, elastomers, dead spaces or valve bodies interposed in the flow path; and the valve mechanism is totally external to the flow passage.

Figure 6:
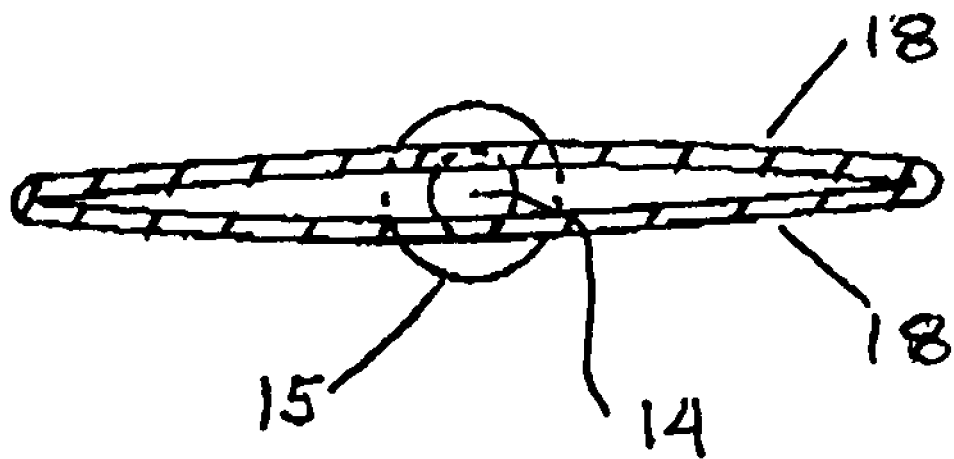
FIG. 6 is a cross-sectional front view of FIG. 5 showing the disks in an open state in accordance with an aspect of the invention.

FIG. 6 is a further illustration of the structural principle of the pinch value according to an aspect of the invention. FIG. 6 is a cut-away view of FIG. 5 without the clamps 24 in place. The disks 18 are curved slightly in the relaxed (i.e. open) condition. The curve is chosen so the clamping or closing process (flattening) does not exceed the yield or spring point of the disk material. By so doing, when the clamps are loosened from the flat or closed position, the disks spring open to provide a flow path 14 as shown in FIG. 6. The disks are also strong enough to spring open whether the pressure inside tubing 15 is positive or negative. The disks 18 are comprised of any metal that is capable of maintaining a spring action over many thousands of transitions between a closed and open state. Preferably the metal can be selected so as to be non-reactive with the material in the flow path.

Alternatively, the annular mating surfaces 18 including their respective tapered entry and exit paths and/or clamps 22 may be fabricated from a shape memory alloy such as titanium nickel. In this case, the opposing closure sections and/or their respective clamps are pre programmed to deform in a desired orientation with respect to each other so as to form a fluid tight seal between interior surfaces of disks 18 in the closure region upon reaching an activation threshold and phase change. For example clamps 22 could comprise resistive heating elements constructed in accordance with techniques that are well known. The application of an electric current through resistive heating elements provided around the closure region may be used to activate the phase transition and assumption of a preprogrammed shape for effecting closure and a fluid tight seal between interior surfaces of disks 18. In most shape memory alloys, a temperature change of only about 10° C. is necessary to initiate the phase change and assumption of the pre programmed shape. The most effective and widely used alloys include NiTi (Nickel-Titanium), CuZnAl, and CuAlNi.

Shape memory alloy tubing is available from, for example, MicroGroup, Inc., 7-T Industrial Park Rd. Medway, Mass. 02053. In all such equivalent arrangements, the closure region is tapered into the respective entry and exit flow paths to maintain laminar flow, Also, the closure mechanism, for example resistive heating elements, that effects a fluid tight seal by activating the mating of the sealing surfaces is external to the flow path and is not adversely affected by fluid flow.

While the invention has been described in connection with what are presently considered to be the most practical and preferred embodiments, it is to be understood that the invention is not limited to the disclosed embodiments, but on the contrary, is intended to cover various modifications and equivalent arrangements included within the scope of the appended claims.

I claim:

1. A valve comprising:
   a first tubular section defining an entry flow path for a flowable material;
   a second tubular section defining an exit flow path;
   a closure region provided between the first and second tubular sections, the closure region comprising first and second opposed mating surfaces having a spring action for transitioning between a closed and open state, respectively, upon the application and removal of an external stimulus, such that flow through the closure region is truncated when said mating surfaces are seated in the closed state; and
   the first and second tubular sections are tapered adjacent the annular region to preserve laminar flow, wherein the closure region comprises a material capable of assuming a predetermined shape in response to an applied electric current for effecting closure of the flow path.

* * * * *